United States Patent Office 3,249,594
Patented May 3, 1966

3,249,594
PROCESS FOR POLYMERIZING A MONOMERIC MATERIAL IN THE PRESENCE OF AN INSOLUBLE SALT OF A FATTY ACID
Frank J. Donat, Cleveland, and Edwin H. Baker, Cuyahoga Falls, Ohio, assignors to The B. F. Goodrich Company, New York, N.Y., a corporation of New York
No Drawing. Filed Dec. 26, 1961, Ser. No. 162,223
The portion of the term of the patent subsequent to Jan. 26, 1982, has been disclaimed or dedicated to the Public
16 Claims. (Cl. 260—84.1)

This invention relates to emulsion type vinyl aromatic resins and more particularly pertains to spherical, uniform particle size vinyl aromatic resins and to a process for preparing same in an aqueous emulsion comprising the use of polyvalent insoluble soaps as the sole emulsifiers.

The chemical literature reveals that several methods have been suggested for the provision of particular vinyl aromatic resins that are composed of spherical uniform particles. One of these references refers to a method for the provision of spherical uniform particle size polystyrene and styrene-butadiene latex resins wherein a soluble soap is used as the emulsifier in amounts insufficient to establish the critical micelle concentration. Another method refers to a multiple-step procedure known as the seeding process wherein styrene-butadiene latex resins are prepared having spherical, uniform particles. Both the emulsifier deficient and the seeding process require highly critical techniques.

The uses of uniform particle size vinyl aromatic resins are many and diverse. For example, spherical, uniform particle size polystyrene latex resins are useful as secondary calibration standards for investigations in electron microscopy, light microscopy, light scattering, sedimentation studies and aerosol studies. Latex paint formulation theories state that there are reasons for believing that a film-forming, uniform particle size vinyl aromatic latex resin is desirable to minimize the problems of stability and reproducibility of flow properties. U.S. Patent 2,553,916 states that it is advantageous in synthetic resin paste formulations to bring about a paintable or pourable condition with a minimum of liquid plasticizer. U.S. Patent 2,553,916 teaches that powders of synthetic resins that are composed of a mixture of two uniform particle size resins with the larger uniform particle size resin having a particle size at least six times the size of the smaller uniform particle size resin requires a minimum of plasticizer.

It will become apparent from the discussion of our invention that our uniform particle size vinyl aromatic resins have utility in the aforementioned areas.

The use of materials commonly referred to as "polyvalent insoluble soaps," "polyvalent heavy metal soaps" and "polyvalent metallic soaps" as the sole emulsifiers for the emulsion polymerization of vinyl aromatics or mixtures of vinyl aromatics with other polymerizable monomers was not known at the time of the present invention. The prior art does not teach or suggest that such soaps would have any utility, per se, in the polymerization reaction. There is no indication in the prior art that such materials would have any value as emulsifiers in any aqueous system particularly in view of their known limited solubility in water. The "polyvalent insoluble soaps" embodied herein are not regarded as emulsifiers for water systems. This invention, which is discussed in more detail below, is indeed unexpected in view of the prior art.

It is an object of this invention to provide vinyl aromatic resins that have spherical, uniform size particles. Another object of this invention is to provide spherical, uniform particle size vinyl aromatic resins in a single step polymerization. Still another object is the provision of a method for preparing spherical, uniform particle size vinyl aromatic resins having a predetermined particle size.

That the accomplishment of the foregoing and other objects have been achieved will become evident from the following description and examples.

We have discovered a method for preparing spherical, uniform particle size polyvinyl aromatic resins comprising conducting the polymerization of a monomer mixture of from 50 to 100% by weight of at least one vinyl aromatic monomer and from 0 to 50% by weight of at least one other polymerizable monomer in water with agitation in the presence of a polyvalent insoluble soap as the sole emulsifier.

Thus, the vinyl aromatic resins included herein are homopolymers of a vinyl aromatic monomer, copolymers and interpolymers of at least 50% by weight of a vinyl aromatic monomer and up to 50% by weight of one or more various other vinyl monomers copolymerizable with the vinyl aromatic monomer. For the purpose of this invention, the vinyl aromatic monomer which may be homopolymerized or polymerized with one or more other vinyl monomers are those aromatic compounds that have one vinyl group and also have from 8–18 carbon atoms. The aromatic ring structure can be substituted in not more than two positions with a member selected from the group consisting of halide atoms and alkyl groups with 1 to 4 carbon atoms. Such monomers include o-chlorostyrene, 2-chloro-4-bromostyrene, p-methylstyrene, 2-methyl-4-ethyl styrene and 2-chloro-4-methyl styrene. Also, the polymerizable vinyl part of the vinyl aromatic monomer may be substituted in the alpha position with a member selected from the group consisting of halides and alkyl groups of from 1 to 4 carbon atoms. Such monomers include alpha-methyl styrene and alpha-bromo styrene and the like. Also included are such monomers as alpha-chloro-p-chloro styrene and 3,4-dichloro-alpha-methyl styrene and the like.

The preferred vinyl aromatic monomer is styrene or a substituted styrene with the substitution being made on the ring in not greater than two positions and on the alpha carbon of the polymerizable vinyl group with a member selected from the group consisting of halide atoms and alkyl groups of 1 to 4 carbon atoms.

Most preferred are the vinyl aromatic monomers having the structure

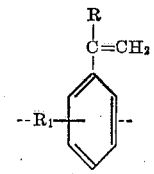

wherein R and R₁ are each members selected from the group consisting of hydrogen, chlorine and an alkyl group having from 1 to 2 carbon atoms.

Included in the group of various other vinyl monomers copolymerizable with the vinyl aromatic constituent are those monomers having unsaturated groups selected from the class consisting of

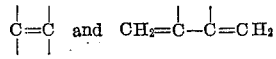

groupings. Such vinyl monomers include vinyl halides such as vinyl chloride, vinyl bromide, vinyl fluoride, vinylidene chloride, vinylidene bromide, vinylidene fluoride, chlorotrifluoro ethylene, 1,2-dichloroethylene, and the like; the acrylate and methacrylate esters such as methyl acrylate, ethyl acrylate, propyl acrylate, isopropyl acrylate, the butyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylates, cyclohexyl methacrylates and the like; the dienes such as 1,3-butadiene, 1,3-butadiene having the 2 position substituted with a member selected from the group consisting of halo atoms and alkyl groups of from 1 to 4 carbon atoms, 1,3-butadiene substituted at the 2 and 3 positions with members selected from the group consisting of halo atoms and alkyl groups of from 1 to 4 carbon atoms. Such substituted 1,3-butadienes include 2,3-dimethyl-1,3-butadiene, 2,3-dichloro-1,3-butadiene, 2-methyl-3-chloro-1,3-butadiene and the like; vinyl cyanides such as acrylonitrile, methacrylonitrile, vinylidene cyanide, fumaronitrile, maleonitrile, and the like and others; divinyl benzenes such as 1,4-divinyl benzene, 1,3-divinyl benzene and the like and others.

Most preferred are the homopolymers, copolymers and interpolymers of from 50 to 100% by weight of styrene and from 0 to 50% by weight of at least one other monomer selected from the group consisting of

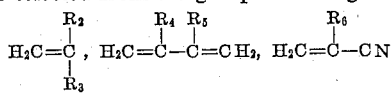

and

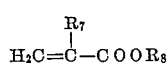

wherein $R_2$ is a chlorine atom, $R_3$ is a member selected from the group consisting of hydrogen and chlorine, $R_4$ and $R_5$ are members selected from the group consisting of hydrogen, chlorine and an alkyl group containing from 1 to 2 carbon atoms, $R_6$ and $R_7$ are members selected from the group consisting of hydrogen and an alkyl group containing from 1 to 2 carbon atoms, and $R_8$ is a hydrocarbon group containing from 1 to 12 carbon atoms. Even more preferred are the monomers in which $R_8$ is an alkyl group containing from 1 to 8 carbon atoms.

The polyvalent metallic soaps or polyvalent insoluble soaps useful as the sole emulsifiers in the present invention include polyvalent metal salts of saturated, unsaturated and substituted fatty acids. The polyvalent moieties of the soaps embodied herein include in general any metals of Groups II, III and IV of the Mendeléeff's periodic table (the metals of said groups have a valency within the range of two to four) and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic and the like. Most preferred are the monobasic saturated fatty acids having from 8 to 22 carbon atoms. The emulsifiers embodied herein are most useful in the range of from 0.01 part to 5 parts by weight (per 100 parts of monomer) and preferably from 0.1 to 2.0 parts.

Most preferred in this invention are the insoluble soaps having the formula

wherein A is an alkyl group having from 7 to 21 carbon atoms and M is a member selected from the group consisting of barium, calcium, magnesium, cadmium, zinc, lead, tin and aluminum and $n$ is an integer equal to the valence of M.

The vinyl polymer latices of fine particle dispersions produced by the process of this invention generally contain polymer existing as uniform, spherical particles having average diameters of from 0.1 to 10 microns and more preferably from about 0.1 to 3 microns in diameter.

The process of this invention is carried out conveniently in a small polymerizer with stirring or in glass quart "soda pop" bottles, preferably in the substantial absence of elemental oxygen and in the presence of a free-radical initiator at a temperature of about 100° C. or below, the temperature being measured at standard pressure. Thus, with superatmospheric pressure the reaction may be carried out at temperatures greater than 100° C. The polymerization reaction can be carried out at atmospheric, sub-atmospheric or superatmospheric pressure. Preferably, the polymerization is carried out at a reaction temperature in the range of from about 30° C. to 100° C., the temperature being measured at standard pressure. In general, the polymerization temperature chosen does not influence the particle size of the product, but those skilled in the art know lower temperatures tend to produce higher molecular weight polymers and higher temperatures tend to produce lower molecular polymers. It is also known that lower molecular weight resins soften at somewhat lower temperatures than their higher molecular weight analogues.

The free-radical initiators useful in the present invention include chemicals which decompose to produce free radicals under the foregoing reaction conditions as well as various forms of actinic radiation such as ultraviolet light, X-rays and the various types of nuclear radiation. Preferred as free-radical initiators in the present invention are commonly used polymerization initiators including the peroxides, azo compounds and redox catalysts. Most preferred are the water-soluble initiators such as potassium persulfate, ammonium persulfate, sodium persulfate, hydrogen peroxide, potassium perphosphate and the like as well as the well-known water-soluble redox initiators. The free-radical initiator is most useful in the range of from about 0.01 part to 3 parts per hundred parts of monomer and more preferably from 0.05 part to 0.3 part per hundred of monomer.

Conventional emulsion polymerization buffers may be employed in the present process although they are not necessary for the practice of this invention. Buffers such as ammonia, $NaHCO_3$, $NH_4HCO_3$ and other water-soluble salts generally give slightly more stable latices. The pH of the polymerization mixture does not appear to be critical and it can be varied from about 2 to 10. However, a pH of between 6 and 10 is preferred.

In the novel polymerization process embodied herein the best results are obtained and the most stable latices result when mild but thorough agitation is employed. Stated differently, the most stable latices result from the process embodied herein when good mixing with low shear stirring is employed during the course of the polymerization. The use of high shear stirring is actually a convenient method to coagulate the latex if it is desired to do so either during or after completion of the polymerization reaction. The use of conventional emulsifiers as additional stabilizers after the completion of the polymerization reaction is within the scope of the present invention. It is essential that the polymerization be carried to completion in the presence of the polyvalent insoluble soaps as sole emulsifier, however.

The vinyl aromatic resins embodied herein may be isolated from their latices by the use of conventional methods of coagulation with such agents as sodium chloride, calcium acetate, sodium carbonate, alcohols, hydrochloric acid, sulfuric acid and the like by procedures well known in the art. The vinyl aromatic resin latices embodied herein can also be heat coagulated, shear coagulated, freeze coagulated, spray dried or coagulated through water evaporation in film forming vinyl aromatic resins. The coagulated resin is conveniently isolated by filtration, centrifugation or decantation and may be dried in conventional drying equipment.

The polyvalent insoluble soaps embodied herein may be used per se or they may be generated in situ in the polymerization mixture. When the soaps are used per se, it is generally necessary to homogenize the monomer prior to starting the polymerization. However, when the insoluble soap is generated in situ, the homogenization step is usually not necessary. The insoluble soap such as barium laurate may be generated in situ, for instance, by adding to the aqueous polymerization mixture substantially stoichiometric quantities of barium hydroxide and lauric acid.

The vinyl aromatic resins embodied herein are distinguished from other conventional emulsion type vinyl aromatic resins in that the latter are not spherical, uniform particle size resins. For example, polystyrene prepared with a conventional soluble soap emulsifier will usually have broad particle size distribution with the average particle size generally less than 3,000 A.

In the following examples which will serve to illustrate the process of the invention, the amounts of ingredients are expressed in parts by weight unless otherwise indicated.

*Example I*

The polymerization was carried out in a small reactor equipped with a single blade stirrer. Into the reactor was charged 300 parts of demineralized water, 0.5 part of finely-divided barium laurate and 100 parts of highly purified styrene monomer. The reactor was sealed and then was alternately purged with nitrogen and evacuated. Next the reactor was pressured to 14 pounds per square inch with nitrogen. The reactor was next submerged in a 60° C. water bath. The styrene monomer was prehomogenized by alternately stirring the reaction mixture at 665 revolutions per minute for one minute and then quiescence for one minute. This alternation procedure was repeated ten times. The reactor stirring speed was next reduced to 196 revolutions per minute and 0.2 part of potassium persulfate was injected into the reactor.

The polymerization was carried out at 60° C. and 196 revolutions per minute for about 41 hours. At the end of this period the reactor was removed from the bath and then allowed to cool. The resulting polystyrene latex was poured from the reactor. The latex was found to have a pH of 6.5. A small sample of the latex was diluted with distilled water and the particle size and shape was determined by depositing a small amount of the diluted latex on a copper grid, carefully drying and taking an electron photomicrograph of the deposited particles using a Philips (Model E.M. 100B) electron microscope. The latex particles were found to be very uniform spheres having diameters of about 8,500 A. (0.85 micron).

The remainder of the latex was coagulated and from the weight of the coagulated polymer a 93 percent conversion was calculated. About 91% of the polymer in this polymerization was obtained in latex form.

Also, an analog of styrene, vinyl toluene was polymerized by the aforementioned procedure. The recipe consisted of 100 parts vinyl toluene, 0.1 part potassium persulfate, and 1.0 part barium laurate. A polymerization temperature of 75° C. was employed. The reaction was carried to an 87% conversion in 21 hours. A large uniform particle size resin was obtained, similar to that obtained in the aforementioned styrene polymerization.

*Example II*

This series of polymerizations is similar to Example I in that an insoluble soap was used as the sole emulsifier, but the polymerizations were carried out in one quart soda pop bottles.

Into each bottle in this series, under a nitrogen sweep, demineralized water, finely-divided insoluble soap, highly purified styrene monomer, ammonium hydroxide and potassium persulfate initiator were added. The bottles were capped, placed in metal shields and then placed in a rotating polymerization bath. All polymerizations were carried out at 75° C.

Table 1 lists the members of this series indicating the insoluble soap emulsifier, levels of the constituents in the recipe, reaction time, pH of the latex and particle size of the latex.

TABLE 1

| Emulsifier | Percent Conversion | H$_2$O | K$_2$S$_2$O$_8$ | 28–30% HN$_4$OH, ml. | pH | Temp., °C. | Reaction Time, Hrs. | Particle Size |
|---|---|---|---|---|---|---|---|---|
| Aluminum myristate | 0.5 | 94 | 300 | 0.1 | 0.2 | 8.6 | 75 | 25.5 | 10,000 A. uniform. |
| Aluminum stearate | 0.5 | 94 | 300 | 0.1 | 0.2 | 8.2 | 75 | 25.5 | 7,800 A. uniform. |
| Calcium laurate | 0.5 | 93 | 300 | 0.1 | 0.2 | 8.4 | 75 | 25.5 | 9,200 A. uniform. |
| Calcium myristate | 0.5 | 97 | 300 | 0.1 | 0.2 | 8.6 | 75 | 25.5 | 8,500 A. uniform. |
| Calcium palmitate | 0.5 | 97 | 300 | 0.1 | 0.2 | 8.5 | 75 | 25.5 | 7,800 A. uniform. |
| Calcium stearate | 0.5 | 97 | 300 | 0.1 | 0.2 | 8.4 | 75 | 25.5 | 10,800 A. uniform. |
| Magnesium laurate | 0.5 | 97 | 300 | 0.1 | 0.2 | 8.4 | 75 | 25.5 | 12,000 A. uniform. |
| Magnesium myristate | 0.5 | 99 | 300 | 0.1 | 0.2 | 8.5 | 75 | 25.5 | 9,000 A. uniform. |
| Magnesium stearate | 0.5 | 97 | 300 | 0.1 | 0.2 | 8.3 | 75 | 25.5 | 8,000 A. uniform. |
| Lead stearate | 0.5 | 90 | 300 | 0.1 | 0.2 | 9.3 | 75 | 25.0 | 8,100 A. fairly uniform. |
| Tetrastearyl titanate | 0.5 | 98 | 300 | 0.1 | 0.2 | 9.4 | 75 | 25.0 | 8,500 A. uniform. |

*Example III*

This series of polymerizations was prepared according to the procedure used in Example II. The polymerizations of Example II, which are listed in Table 1, used a single insoluble soap as the sole emulsifier at a level of 0.05 part per 100 parts of styrene monomer. In this series of polymerizations the single insoluble soap emulsifier was replaced with a mixture of two insoluble soaps. The total insoluble soap level was the same as was used in Example II, that is, 0.5 part per 100 parts of styrene monomer.

Table 2 lists the members of this series showing the insoluble soap mixtures percent conversions, levels the recipe constituents, final latex pH, reaction time and temperature and particle size.

TABLE 2

| Emulsifier | Percent Conversion | H₂O | K₂S₂O₈ | 28% HN₄OH, ml. | pH | Temp., °C. | Reaction Time, Hrs. | Particle Size |
|---|---|---|---|---|---|---|---|---|
| Calcium laurate | 0.25 | 95 | 300 | 0.1 | 0.2 | 9.3 | 74 | 25 | 9,000 A. fairly uniform. |
| Magnesium laurate | 0.25 | | | | | | | | |
| Calcium laurate | 0.25 | 90 | 300 | 0.1 | 0.2 | 9.4 | 75 | 25 | 8,800 A. uniform. |
| Barium laurate | 0.25 | | | | | | | | |
| Magnesium laurate | 0.25 | 97 | 300 | 0.1 | 0.2 | 9.2 | 75 | 25 | 10,000 A. uniform. |
| Barium laurate | 0.25 | | | | | | | | |
| Cadmium stearate | 0.25 | 95 | 300 | 0.1 | 0.2 | 9.4 | 75 | 25 | 7,800 A. uniform. |
| Barium stearate | 0.25 | | | | | | | | |

Example IV

In this series of polymerizations various representative copolymers of styrene were prepared according to the procedure used in Example II. Table 3 lists these copolymers. The parts styrene, comonomer, parts, comonomer, polyvalent insoluble soap emulsifier, parts polyvalent insoluble soap emulsifier, percent conversion, polymerization temperature, reaction time and particle size for each copolymerization are shown. In all of these copolymerizations 0.1–0.2 part per 100 parts of monomers of potassium persulfate was used as the initiator. 0.2 ml. ammonium hydroxide (28–30% NH₃) per 100 parts of monomers was used as a buffer in all styrene-acrylonitrile and styrene-butadiene copolymerizations.

Also, a terpolymer was prepared by the aforementioned procedure. The following recipe was used:

Styrene, 60; acrylonitrile, 25; 1,3-butadiene, 15; potassium persulfate, 0.1; barium laurate, 1.0, and ammonium hydroxide, 0.2 ml.

All quantities are expressed in parts per 100 parts of monomers, unless otherwise indicated. A polymerization temperature of 75° C. was employed. A large uniform particle size resin was obtained.

TABLE 3

| Parts Styrene | Comonomer | Parts | Emulsifier | | Percent Conversion | Temp., °C. | Reaction Time, Hrs. | Particle Size |
|---|---|---|---|---|---|---|---|---|
| 90 | Vinylidene chloride | 10 | Lead stearate | 0.3 | 96 | 75 | 24 | 9,000 A. uniform. |
| 90 | do | 10 | Barium laurate | 0.5 | 98 | 75 | 24 | 10,000 A. uniform. |
| 50 | do | 50 | Lead stearate | 0.3 | 98 | 75 | 24 | 7,200 A. uniform. |
| 50 | do | 50 | Barium laurate | 0.5 | 98 | 75 | 24 | 6,500 A. uniform. |
| 85 | Methyl methacrylate | 15 | do | 1.0 | 98 | 75 | 18 | 6,400 A. uniform. |
| 70 | do | 30 | do | 1.0 | 95 | 75 | 18 | 5,900 A. fairly uniform. |
| 50 | do | 50 | do | 1.0 | 97 | 75 | 18 | 6,800 A. uniform. |
| 50 | Acrylonitrile | 50 | do | 1.0 | 96 | 75 | 20.5 | 4,400 A. uniform. |
| 70 | do | 30 | do | 1.0 | 94 | 75 | 20.5 | 4,000 A. uniform. |
| 50 | 1,3-butadiene | 50 | do | 1.0 | 50 | 75 | 24 | 3,000 A. uniform. |
| 70 | do | 30 | Cadmium stearate | 1.0 | 65 | 75 | 24 | 2,800 A. uniform. |

We claim:

1. The method for preparing in aqueous emulsion a uniform particle size styrene resin having a particle size within the range of 0.1 to 10 microns in diameter which comprises polymerizing a monomer mixture of from 50 to 100% by weight of styrene monomer and from 0 to 50% by weight of at least one other unsaturated monomer copolymerizable with styrene, in water, with agitation in the substantial absence of oxygen and in the presence of a free-radical catalyst and, as the sole emulsifying agent, from 0.01 to 5.0 parts per 100 parts by weight of the monomer of an insoluble soap which is the salt of a fatty acid having from 8 to 22 carbon atoms and a polyvalent metal of Groups II to IV of The Mendeléeff's periodic table.

2. The method of claim 1 wherein the insoluble soap is a salt of barium and a fatty acid having from 8 to 22 carbon atoms.

3. The method of claim 1 wherein the insoluble soap is a salt of aluminum and a fatty acid having from 8 to 22 carbon atoms.

4. The method of claim 1 wherein the insoluble soap is a salt of cadmium and a fatty acid having from 8 to 22 carbon atoms.

5. The method of claim 1 wherein the insoluble soap is a salt of calcium and a fatty acid having from 8 to 22 carbon atoms.

6. The method of claim 1 wherein the insoluble soap is a salt of lead and a fatty acid having from 8 to 22 carbon atoms.

7. The method of claim 1 wherein the insoluble soap is a salt of magnesium and a fatty acid having from 8 to 22 carbon atoms.

8. The method of claim 1 wherein the insoluble soap is a salt of tin and a fatty acid having from 8 to 22 carbon atoms.

9. The method of claim 1 wherein the insoluble soap is a salt of zinc and a fatty acid having from 8 to 22 carbon atoms.

10. The method for preparing a uniform particle size vinyl aromatic resin having a particle diameter within the range of 0.1 to 10 microns comprising polymerizing in the presence of a free-radical catalyst and in the substantial absence of oxygen a monomeric mixture of from 50 to 100% by weight of at least one monomer having the structure

where R and R₁ are each members of the class consisting of hydrogen, chlorine and an alkyl group having from 1 to 2 carbon atoms, and from 0 to 50% by weight of at least one monomer selected from the group consisting of

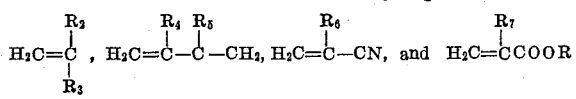

wherein $R_2$ is chlorine, $R_3$ is a member selected from the group consisting of hydrogen and chlorine, $R_4$ and $R_5$ are members selected from the group consisting of hydrogen, chlorine and an alkyl group containing from 1 to 2 carbon atoms, $R_6$ and $R_7$ are members selected from the group consisting of hydrogen and an alkyl group having from 1 to 2 carbon atoms, and $R_8$ is a hydrocarbon group containing from 1 to 12 carbon atoms in water in the presence of from 0.01 part to 3.0 parts per 100 parts of monomers of a free-radical catalyst and from .01 to 5.0 parts per 100 parts of the monomers and as the sole emulsifier at least one polyvalent insoluble soap having the structure $(A-COO)_nM$ wherein A represents an alkyl group having from 7 to 21 carbon atoms and M is a member selected from the group consisting of barium, calcium, magnesium, cadmium, zinc, lead, tin and aluminum and $n$ is an integer equal to the valence of M, with agitation in substantial absence of oxygen at a temperature below about 100° C.

11. The method for preparing a uniform particle size polystyrene resin having a particle diameter within the range of 0.1 to 10 microns comprising polymerizing styrene in water in the presence of from .01 to 3.0 parts by weight per 100 parts of styrene of a free-radical catalyst and as the sole emulsifier from 0.01 to 5.0 parts by weight per 100 parts of styrene of at least one insoluble soap having the structure $(A-COO)_nM$ wherein A represents an alkyl group having from 7 to 21 carbon atoms and M is a member selected from the group consisting of barium, calcium, magnesium, cadmium, zinc, lead, tin and aluminum and $n$ is an integer equal to the valence of M, with agitation in the substantial absence of oxygen at a temperature below about 100° C.

12. The method for preparing a uniform particle size polystyrene resin having a particle diameter within the range of 0.1 to 10 microns comprising polymerizing styrene in water in the presence of from .05 to 0.3 part by weight per 100 parts of styrene of a free-radical catalyst and as the sole emulsifier from 0.1 to 2.0 parts by weight per 100 parts of styrene of barium laurate with agitation in the substantial absence of oxygen at a temperature of from about 30° C. to 100° C.

13. The method for preparing a uniform particle size polystyrene resin having a particle diameter within the range of 0.1 to 10 microns comprising polymerizing a monomer mixture of 50% to 100% by weight of styrene and 0 to 50% by weight of 1,3-butadiene in water in the presence of from .05 to 0.3 part by weight per 100 parts of said mixture of a free-radical catalyst and as the sole emulsifier from 0.1 to 2.0 parts by weight per 100 parts of said mixture of cadmium stearate with agitation in the substantial absence of oxygen at a temperature of from about 30° C. to 100° C.

14. The method for preparing a uniform particle size polystyrene resin having a particle diameter within the range of 0.1 to 10 microns comprising polymerizing a monomer mixture of 50% to 100% by weight of styrene and 0 to 50% by weight of methyl methacrylate in water in the presence of from .05 to 0.3 part by weight per 100 parts of said mixture of a free-radical catalyst and as the sole emulsifier from 0.1 to 2.0 parts by weight per 100 parts of said monomer mixture of barium laurate with agitation in the substantial absence of oxygen at a temperature of from 30° C. to 100° C.

15. The method for preparing a uniform particle size polystyrene resin having a particle diameter within the range of 0.1 to 10 microns comprising polymerizing a monomer mixture of 50% to 100% by weight of styrene and 0 to 50% by weight of acrylonitrile in water in the presence of from .05 to 0.3 part by weight per 100 parts of said mixture of a free-radical catalyst and as the sole emulsifier from 0.1 to 2.0 parts by weight per 100 parts of said monomer mixture of barium laurate with agitation in the substantial absence of oxygen at a temperature of from 30° C. to 100° C.

16. The method for preparing a uniform particle size polystyrene resin having a particle diameter within the range of 0.1 to 10 microns comprising polymerizing a monomer mixture of 50% to 100% by weight of styrene and 0 to 50% by weight of vinylidene chloride in water in the presence of from .05 to 0.3 part by weight per 100 parts of said mixture of a free-radical catalyst and as the sole emulsifier from 0.1 to 2.0 parts by weight per 100 parts of said monomer mixture of lead stearate with agitation in the substantial absence of oxygen at a temperature of from 30° C. to 100° C.

References Cited by the Examiner

UNITED STATES PATENTS

| | | | |
|---|---|---|---|
| 2,777,836 | 1/1957 | Everard | 260—29.6 |
| 2,888,410 | 5/1959 | Bucholtz | 260—2.5 |
| 2,888,422 | 5/1959 | Johnson et al. | 260—23 |
| 2,933,467 | 4/1960 | Borunsky | 260—23 |
| 2,934,529 | 4/1960 | Van Dijk et al. | 260—93.5 |
| 3,167,533 | 1/1965 | Donat | 260—92.8 |

OTHER REFERENCES

Hohenstein and Mark: Jour. of Poly. Sci., vol. 1, 1946, "Polymerization of Olefins and Diolefins in Suspension and Emulsion," pp. 127–144.

"Metallic Soaps," Metasap Chemical Co., Harrison, N.J., copyright 1940, revised 1948, p. 19.

JOSEPH L. SCHOFER, *Primary Examiner.*

WILLIAM H. SHORT, *Examiner.*

M. F. OELAK, J. A. SEIDLECK, *Assistant Examiners.*

UNITED STATES PATENT OFFICE
CERTIFICATE OF CORRECTION

Patent No. 3,249,594                                        May 3, 1966

Frank J. Donat et al.

It is hereby certified that error appears in the above numbered patent requiring correction and that the said Letters Patent should read as corrected below.

Column 6, line 65, for "0.05" read -- 0.5 --; columns 7 and 8, TABLE 2, heading to column 1, for "Cmulsifier" read -- Emulsifier --; same table, in the heading to column 5, for "HN4OH" read -- NH4OH --; column 7, line 34, for "1,0," read -- 1.0, --; column 9, lines 2 to 4, for

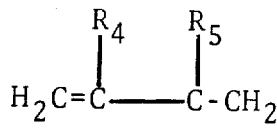        read        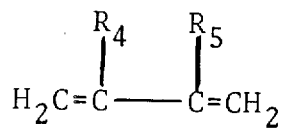

same lines 2 to 4 for

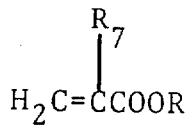        read        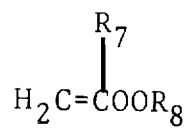

Signed and sealed this 22nd day of August 1967.

(SEAL)
Attest:

ERNEST W. SWIDER                           EDWARD J. BRENNER
Attesting Officer                          Commissioner of Patents